(12) United States Patent
Kumagai

(10) Patent No.: US 10,567,067 B2
(45) Date of Patent: Feb. 18, 2020

(54) WIRELESS BASE STATION, WIRELESS COMMUNICATION METHOD, AND WIRELESS COMMUNICATION SYSTEM

(71) Applicant: FUJITSU LIMITED, Kawasaki-shi, Kanagawa (JP)

(72) Inventor: Shinya Kumagai, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/896,900

(22) Filed: Feb. 14, 2018

(65) Prior Publication Data
US 2018/0262258 A1 Sep. 13, 2018

(30) Foreign Application Priority Data
Mar. 13, 2017 (JP) .................................. 2017-047740

(51) Int. Cl.
*H04B 7/08* (2006.01)
*H04L 5/00* (2006.01)
*H04L 25/02* (2006.01)

(52) U.S. Cl.
CPC .......... *H04B 7/088* (2013.01); *H04B 7/0885* (2013.01); *H04L 5/0048* (2013.01); *H04L 5/0057* (2013.01); *H04L 25/0224* (2013.01)

(58) Field of Classification Search
CPC ... H01Q 1/24; H01Q 3/24; H01Q 3/26; H04B 1/38; H04B 7/00; H04B 7/04; H04B 7/06; H04B 7/08; H04B 7/088; H04B 7/0456; H04B 7/0885; H04L 5/00; H04L 5/0048; H04L 5/0057; H04L 25/02; H04L 25/03; H04L 25/0224; H04L 27/00; H04W 16/28; H04W 72/04; H04W 72/08; H04W 72/12; H04W 88/08; H04W 88/18
USPC ........ 370/328, 239; 375/219, 260, 267, 295, 375/296, 316; 455/509, 561
See application file for complete search history.

(56) References Cited

U.S. PATENT DOCUMENTS

| | | | |
|---|---|---|---|
| 2011/0199986 A1 | 8/2011 | Fong et al. | |
| 2013/0148759 A1* | 6/2013 | Tee ...................... | H04B 7/0695 375/296 |
| 2014/0192761 A1* | 7/2014 | Inoue ................... | H04B 7/0456 370/329 |

(Continued)

FOREIGN PATENT DOCUMENTS

| | | |
|---|---|---|
| JP | 2009-200824 A | 9/2009 |
| JP | 2009-232256 A | 10/2009 |

(Continued)

*Primary Examiner* — Shawkat M Ali
(74) *Attorney, Agent, or Firm* — Arent Fox LLP

(57) ABSTRACT

A wireless base station that includes: a transmitter that employs a plurality of antenna elements to form a beam in each of a plurality of transmission directions and transmit a reference signal; a receiver that receives a value representing reception quality of the reference signal for a user device that has received the reference signal; a memory; and a processor connected to the memory, the processor being configured to employ an indicator value, representing reception quality for a user device group computed from values received by the receiver that represent reception quality for each of a plurality of user devices, in order to select a combination of beams to employ in user data transmission from the plurality of beams transmitted by the transmitter.

15 Claims, 13 Drawing Sheets

(56) References Cited

U.S. PATENT DOCUMENTS

| | | | |
|---|---|---|---|
| 2014/0204846 A1* | 7/2014 | Maltsev | H04B 7/0617 370/329 |
| 2017/0149480 A1* | 5/2017 | Kakishima | H04J 11/00 |
| 2017/0238294 A1* | 8/2017 | Lim | H04B 7/0695 370/277 |
| 2019/0058558 A1* | 2/2019 | Lee | H04B 7/0695 |
| 2019/0089420 A1* | 3/2019 | Koskela | H04B 7/0417 |

FOREIGN PATENT DOCUMENTS

| | | |
|---|---|---|
| JP | 2012-186704 A | 9/2012 |
| JP | 2013-519337 A | 5/2013 |

\* cited by examiner

BEAM TRANSMISSION
DIRECTION

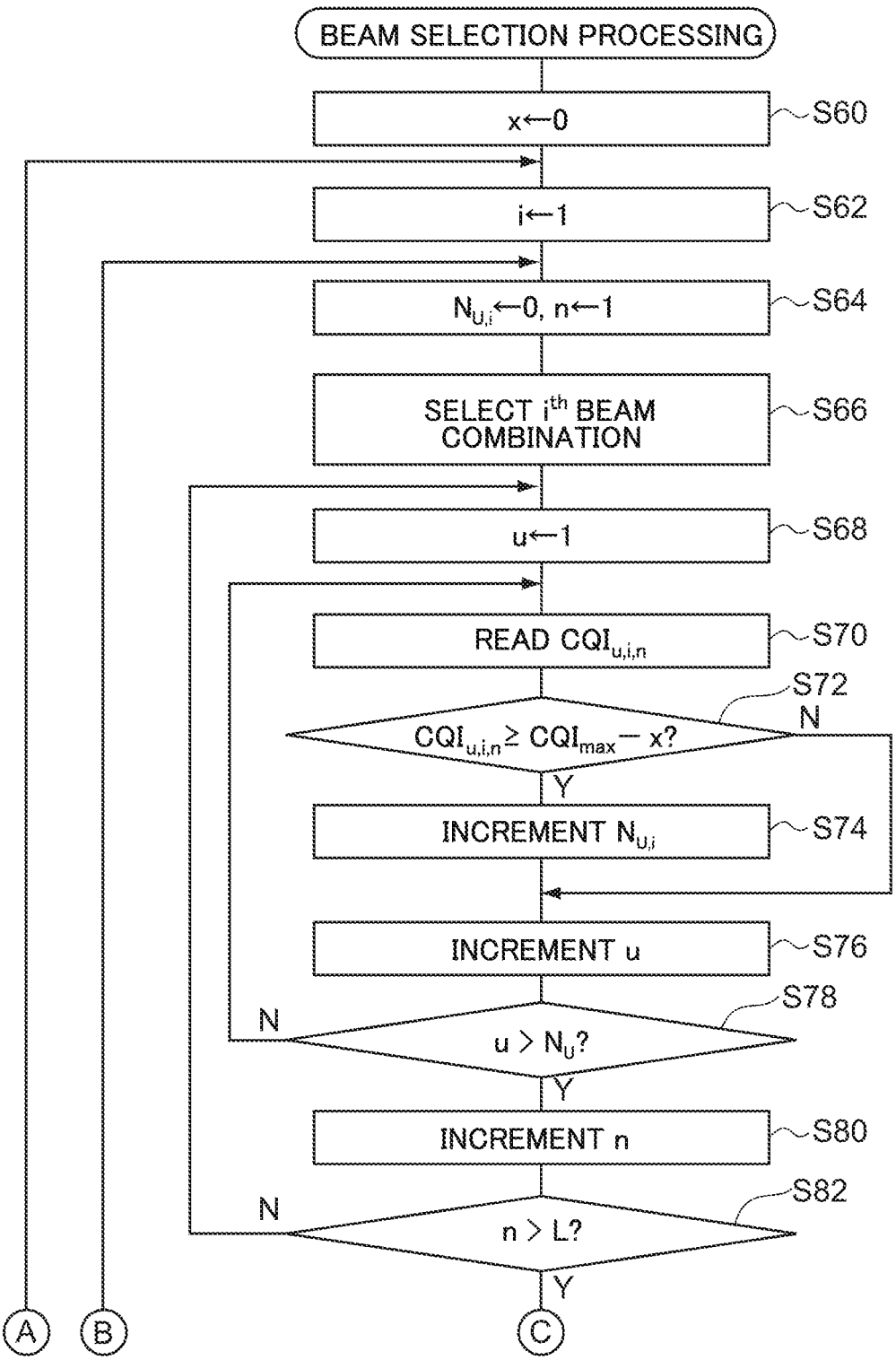

BEAM PATTERN #1

BEAM PATTERN #2

WIRELESS BASE STATION, WIRELESS COMMUNICATION METHOD, AND WIRELESS COMMUNICATION SYSTEM

CROSS-REFERENCE TO RELATED APPLICATION

This application is based upon and claims the benefit of priority of the prior Japanese Patent Application No. 2017-047740, filed on Mar. 13, 2017, the entire contents of which are incorporated herein by reference.

FIELD

The embodiments discussed herein are related to a wireless base station, a wireless communication method, and a wireless communication system.

BACKGROUND

Technology has been proposed in which plural antennas are used to form beams in plural directions from a wireless base station and transmit a pilot signal to a user devices. In such technology, beam combinations are selected based on pilot signal reception status values from user devices that received the pilot signal.

RELATED DOCUMENTS

Related Patent Documents

Japanese Patent Application Laid-Open (JP-A) No. 2009-200824 JP-A No. 2009-232256

SUMMARY

According to an aspect of the embodiments, a wireless base station includes: a transmitter that employs a plurality of antenna elements to form a beam in each of a plurality of transmission directions and transmit a reference signal; a receiver that receives a value representing reception quality of the reference signal for a user device that has received the reference signal; a memory; and a processor connected to the memory, the processor being configured to employ an indicator value, representing reception quality for a user device group computed from values received by the receiver that represent reception quality for each of a plurality of user devices, in order to select a combination of beams to employ in user data transmission from the plurality of beams transmitted by the transmitter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9A and FIG. 9B are flowcharts illustrating an example of beam selection processing according to a first exemplary embodiment.

DESCRIPTION OF EMBODIMENTS

Detailed explanation follows regarding an exemplary embodiment of technology disclosed herein, with reference to the drawings.

First Exemplary Embodiment

Figure 1:
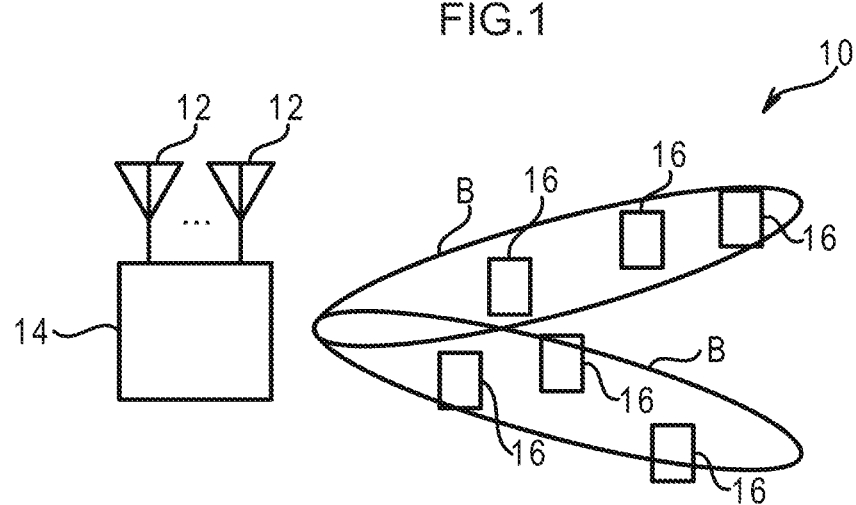
FIG. 1 is a block diagram illustrating a schematic configuration of a wireless communication system according to an exemplary embodiment.
Figure 2:
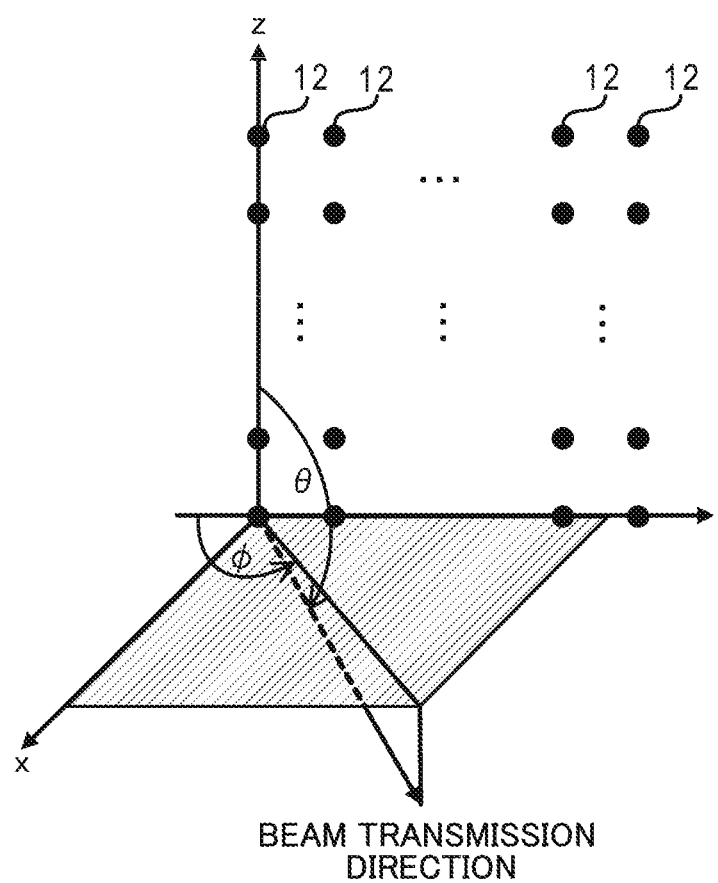
FIG. 2 is a diagram to explain the antenna arrangement of a wireless base station according to an exemplary embodiment.

Explanation first follows regarding configuration of a wireless communication system 10 according to the present exemplary embodiment, with reference to FIG. 1 and FIG. 2. As illustrated in FIG. 1, the wireless communication system 10 includes a wireless base station 14 provided with plural antenna elements 12, and plural user devices 16. Signals are exchanged between the wireless base station 14 and the user devices 16 via wireless communication. Examples of the user devices 16 include smartphones, Internet of Things (IoT) devices, and the like.

As illustrated in FIG. 2, for example, the plural antenna elements 12 are arranged in a grid having k rows and l columns in a vertically oriented plane (the yz plane illustrated in FIG. 2). The wireless base station 14 controls the antenna elements 12 so as to form a beam B in front of the antenna elements 12 and transmit a signal to a user device 16. Note that in the following, as illustrated in. FIG. 2, the vertical angle of the transmission direction for a beam B is expressed by θ (0°≤θ≤180°), and the horizontal angle of the transmission direction for a beam B is expressed by φ (0°≤φ≤180°).

Figure 3:
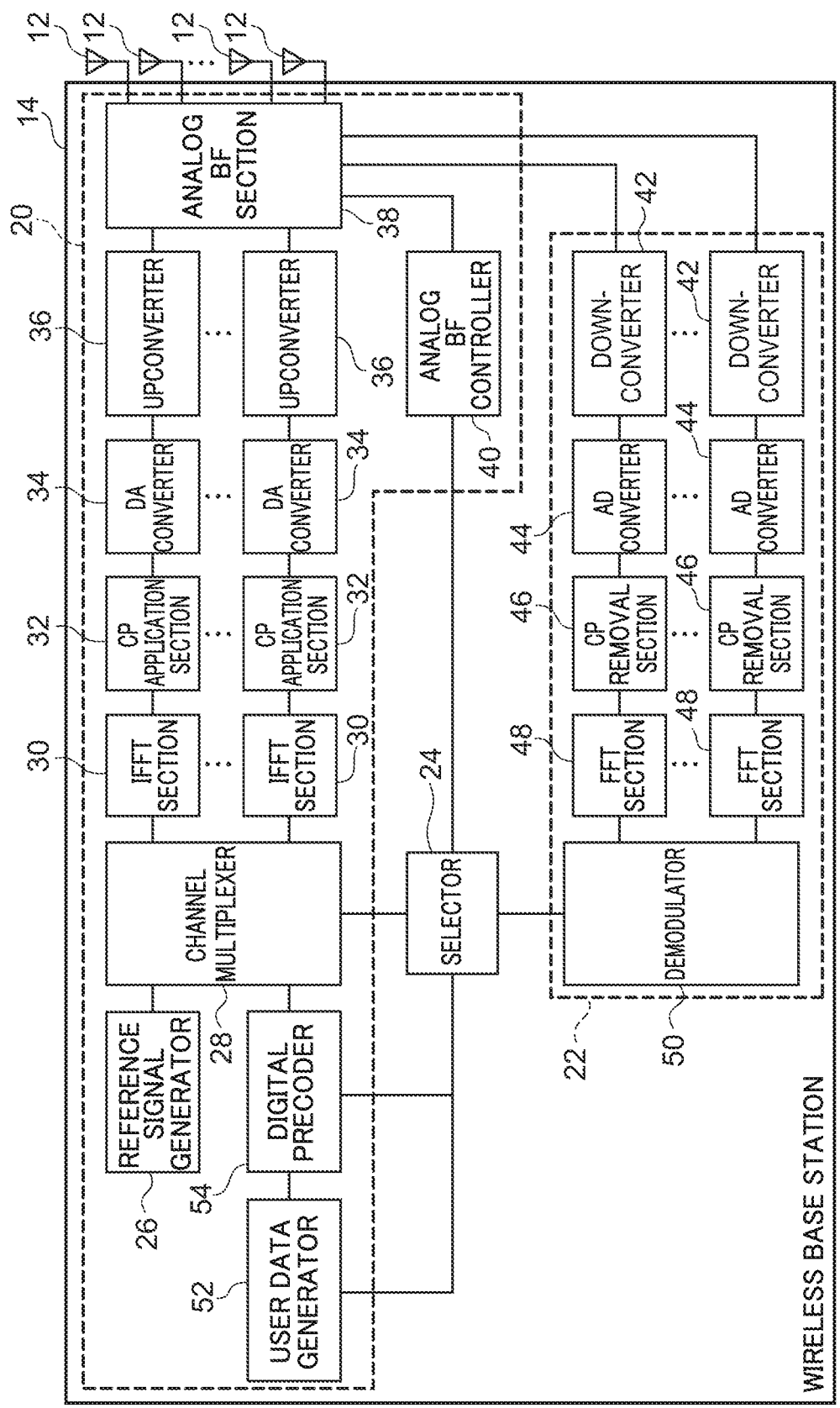
FIG. 3 is a functional block diagram of a wireless base station according to an exemplary embodiment.

Next, explanation follows regarding functional configuration of the wireless base station 14 according to the present exemplary embodiment, with reference to FIG. 3. As illustrated in FIG. 3, the wireless base station 14 includes a transmitter 20, a receiver 22, and a selector 24. The transmitter 20 includes a reference signal generator 26, a channel multiplexer 28, an analog beamforming (BF) section 38, an analog BF controller 40, a user data generator 52, and a digital precoder 54. The transmitter 20 also includes plural sets of an inverse fast Fourier transform (IFFT) section 30, a cyclic prefix (CP) application section 32, a digital-analog (DA) converter 34, and an upconverter 36. The receiver 22 includes plural sets of a downconverter 42, an analog-digital (AD) converter 44, a CP removal section 46, a fast Fourier transform (FFT) section 48, and a demodulator 50.

The transmitter 20 uses the plural antenna elements 12 to form a beam B in each of plural transmission directions and transmit a reference signal. In the present exemplary embodiment, the transmitter 20 transmits a reference signal to all user devices 16 for which a connection with the wireless base station 14 has been established. Note that, for example, the wireless base station 14 is capable of ascertaining which user devices 16 have established a connection with the wireless base station 14 based on the results of initial processing executed by the user devices 16.

Explanation follows regarding the function of each functional section of the transmitter 20 when transmitting a reference signal. The reference signal generator 26 generates a downlink reference signal. The channel multiplexer 28 maps the reference signal generated by the reference signal generator 26 to subcarriers. The IFFT section 30 performs inverse fast Fourier transformation (IFFT) on the subcarriers mapped to the reference signal by the channel multiplexer 28 and converts the subcarriers into valid symbols. The CP application section 32 applies a CP to the valid symbols converted by the IFFT section 30, thereby generating orthogonal frequency-division multiplexing (OFDM) symbols.

The DA converter 34 converts digital signals representing the OFDM symbols generated by the CP application section 32 into analog signals. The upconverter 36 performs frequency conversion to convert the analog signals that have been converted by the DA converter 34 into Radio Frequency (RF) band frequencies.

The analog BF controller 40 controls the analog BF section 38 so as to sequentially form beams B in directions at angles θ and angles φ having predetermined intervals of separation therebetween, and uses the antenna elements 12 to transmit the analog signals that have undergone frequency conversion by the upconverter 36. Note that although the present exemplary embodiment describes a case in which the analog BF controller 40 forms beams at 5° intervals of separation over ranges of 180° for the angles θ and the angles φ, the intervals of separation are not limited to 5° intervals.

For example, the analog BF controller 40 may form beams at intervals of separation other than 5° over ranges of 180° for the angles θ and the angles φ, and configuration may be such that the intervals of separation between the angles θ and differ from that of the angles φ. Further, the analog BF controller 40 may gradually vary the intervals of separation when sequentially forming the beams B. Note that in the following, the interval of separation for the angles θ is expressed as Δθ, and the interval of separation for the angles φ is for expressed as Δφ.

In the present exemplary embodiment, the analog BF controller 40 applies an analog BF vector w(φ, θ) as expressed by Equation (1) below, for example, to the reference signal so as to form a beam B and transmits the reference signal via the antenna elements 12. Note that in Equation (1), $w_{k,l}(\varphi, \theta)$ is a weighting applied to the antenna element 12 in column l(l=1 to NH) of row k (k=1 to Nv), and is, for example, expressed by Equation (2) below. In Equation (2), λ is wavelength (m), and $d_V$ and $d_H$ are respective array intervals (m) between the antenna elements 12 in the vertical direction and the horizontal direction.

$$w(\varphi, \theta) = \\ [w_{1,1}(\varphi, \theta), \ldots, w_{1,N_V}(\varphi, \theta), \ldots, w_{N_H,1}(\varphi, \theta), \ldots, w_{N_H,N_V}(\varphi, \theta)]^T \quad (1)$$

$$w_{k,j}(\varphi, \theta) = \frac{1}{\sqrt{N_H N_V}} \exp\left[j\frac{2\pi}{\lambda}\{(l-1)d_V\cos\theta + (k-1)d_H\sin\theta\cos\varphi\}\right] \quad (2)$$

The analog BF controller 40 applies the analog BF vector w(φ, θ) switching through w(Δφ, Δθ), w(2Δφ, Δθ), and so on to w($N_\varphi$Δφ, $N_\varphi$Δθ) in sequence. The analog BF section 38 thereby sequentially forms beams B and transmits the reference signal in plural different transmission directions. Note that $N_\varphi$ is 180°/Δφ, and $N_\theta$ is 180°/Δθ.

The receiver 22 receives a value (referred to below as "reception quality value") expressing reference signal reception quality that has been returned from the user devices 16 that received the reference signal transmitted under the control of the analog BF controller 40. Note that in the present exemplary embodiment, although explanation is given regarding a case in which a channel quality indicator (CQI) corresponding to a signal-to-interference plus noise power ratio (SINR), which is an example of a value that becomes larger as reception quality increases, is employed as the reception quality value, there is no limitation thereto. For example, the received power value of the reference signal may be applied as the reception quality value, or a reference signal received power (RSRP) value quantizing the received power of the reference signal may be applied as the reception quality value.

Explanation follows regarding the function of each functional section of the receiver 22. The downconverter 42 converts the frequency of analog signals with RF band frequencies that have been received via the analog BF section 38 into base band signals. The analog BF section 38 may apply a predetermined analog BF vector when receiving these signals.

The AD converter 44 converts analog signals that have been frequency-converted by the downconverter 42 into digital signals. The CP removal section 46 removes CP from the digital signals that have been converted by the AD converter 44, thereby generating valid symbols. The FFT section 48 performs fast Fourier transformation (FFT) on the valid symbols generated by the CP removal section 46. The demodulator 50 demodulates the digital signals that have undergone fast Fourier transformation at the FFT section 48.

The receiver 22 performs the above processing on analog signals including a reception quality value that have been returned from each user device 16 that received the reference signal transmitted in a respective beam B. For each reference signal, the receiver 22 thus receives a reception quality value returned from each user device 16 that received that reference signal transmitted in a respective beam B.

The selector 24 employs indicator values representing reception quality for groups of user devices 16 computed using the all reception quality values received by the receiver 22 to select a combination of L beams B (L being an integer greater than or equal to 2 and less than $N_\varphi \times N_\theta$) from the plural beams B transmitted by the transmitter 20. Note that in the present exemplary embodiment, L represents the maximum number of beams B that can be formed at one time by the wireless base station 14, and is, for example, determined by the number of upconverters 36 (namely, the number of wireless processing circuits implementing the upconverters 36). In the present exemplary embodiment, the indicator values increase as reception quality increases.

In the present exemplary embodiment, the selector 24 selects the combination of L beams B with the highest indicator values from out of all combinations of L beams B selected from out of the ($N_\phi \times N_\theta$) beams. Specifically, the selector 24 selects the combination of L beams B for which the number of user devices 16 that returned a reception quality value of at least a specific value is greatest. More specifically, the selector 24 selects the combination of L beams B for which the number of user devices 16 that returned a CQI of $CQI_{max}$, which is the maximum CQI value, is greatest. The number A of user devices 16 employed in this selection is expressed by Equation (3) below. Note that in Equation (3), $M_i$ is the collection of beams B included in the $i^{th}$ combination of L beams B. Moreover, in Equation (3), $N_{U,i,n}$ is the number of user devices 16 for which the derived CQI corresponding to the $n^{th}$ beam B in the $i^{th}$ combination of L beams B is $CQI_{max}$.

$$A = \max_i \sum_{n \in M_i} N_{U,i,R} \qquad (3)$$

Note that the wireless base station 14 according to the present exemplary embodiment is able to employ frequency-division multiplexing within each beam B. Moreover, the wireless base station 14 is able to employ G multiplexing resources in the frequency-division multiplexing within each beam B (G being an integer not less than 2). Namely, the wireless base station 14 is capable of communicating with (L×G) user devices 16 at the same time. Note that the multiplexing technique employed by the wireless base station 14 within each beam B is not limited to frequency-division multiplexing, and a multiplexing technique other than space-division multiplexing, for example time-division multiplexing or code-division multiplexing, may be employed.

In the present exemplary embodiment, so as to enable signal reception at the specific reception quality or better for as many user devices 16 as possible, in cases in which L×G≤A, the selector 24 selects a combination of L beams B in the following manner. Namely, in such cases, the selector 24 selects beam B combination i* expressed by Equation (4) as the combination of beams B when data for transmission (referred to hereafter as "user data") to the user devices 16 is transmitted to the user devices 16.

$$i^* = \arg\max_i \sum_{n = M_i} N_{U,i,n} \qquad (4)$$

However, in cases in which L×G>A, the selector 24 lowers the specific value to select a combination of L beams B. Specifically, in such cases, the selector 24 selects the combination of L beams B for which the number of user devices 16 that returned a CQI of at least ($CQI_{max}$-1) is greatest. Moreover, in cases in which the number A of user devices 16 computed using Equation (3) is greater than or equal to (L×G), the selector 24 selects the beam B combination i* expressed by Equation (4) above as the combination of beams B when transmitting user data to the user devices 16.

Moreover, in cases in which the number A of user devices 16 is less than (L×G), the selector 24 selects the combination of L beams B for which the number of user devices 16 that returned a CQI of at least ($CQI_{max}$-2) is greatest. In this manner, in cases in which L×G>A, the selector 24 repeatedly performs processing in which the specific value is lowered in increments of 1 to select a combination of L beams B until (L×G)≤A. The selector 24 selects the combination of L beams B where L×G≤A is first satisfied as the combination of beams B when transmitting user data to the user devices 16.

With regards to user devices 16 for which the condition employing CQI to select the combination of beams B has been satisfied, the selector 24 allocates a frequency-division multiplexing multiplexing resource to each of the plural user devices 16 receiving the same beam B. When performing this allocation, in cases in which the number of user devices 16 that have satisfied the above condition exceeds the number G of multiplexing resources available, the selector 24 allocates multiplexing resources in sequence from the user devices 16 having the highest CQIs.

For user devices 16 allocated the same multiplexing resource but receiving different beams B, the selector 24 also derives a digital precoding weighting that reduces electromagnetic wave interference for space-division multiplexing.

Next, explanation follows regarding the function of the transmitter 20 when sending user data. The user data generator 52 generates user data for each user device 16 that is a user data transmission destination. The digital precoder 54 multiplies the user data generated by the user data generator 52 by the digital precoding weighting derived by the selector 24 corresponding to the respective transmission destination user device 16.

The channel multiplexer 28 maps the user data that has been multiplied by a digital precoding weighting by the digital precoder 54 to subcarriers, employing the respective multiplexing resource allocated by the selector 24 for each transmission destination user device 16. The IFFT section 30, the CP application section 32, the DA converter 34, and the upconverter 36 perform similar processing to that during reference signal transmission.

The analog BF controller 40 controls the analog BF section 38 and applies analog BF vectors corresponding to the combination of L beams B selected by the selector 24 to form L beams B and transmit the user data to the transmission destination user devices 16.

Figure 4:
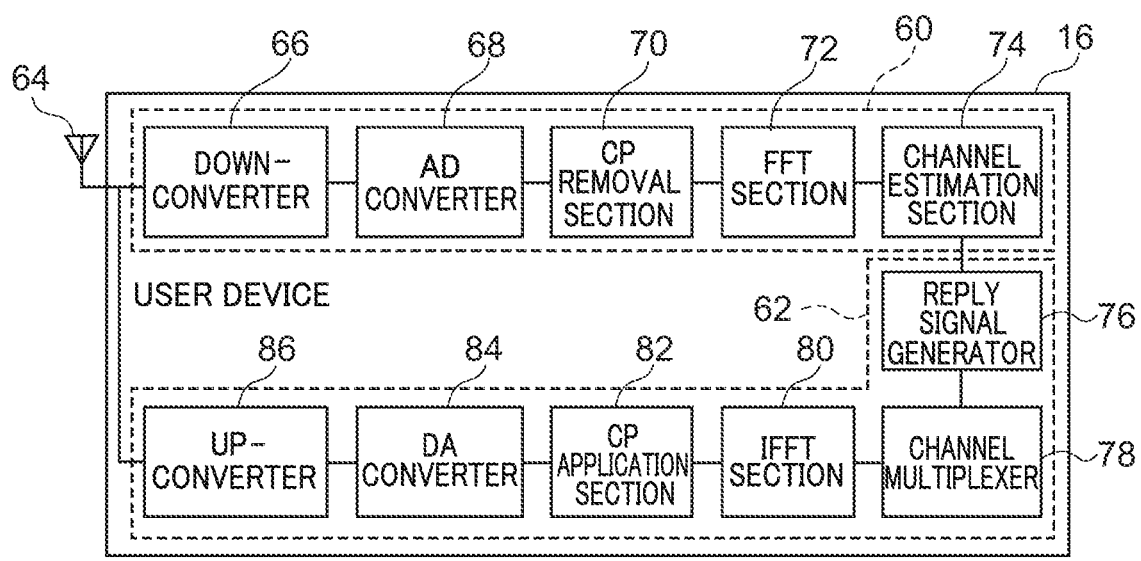
FIG. 4 is a functional block diagram of a user device according to an exemplary embodiment.

Next, explanation follows regarding functional configuration of the user devices 16 according to the present exemplary embodiment, with reference to FIG. 4. As illustrated in FIG. 4, each user device 16 includes a receiver 60 and a transmitter 62. The receiver 60 includes a downconverter 66, an AD converter 68, a CP removal section 70, an FFT section 72, and a channel estimation section 74. The transmitter 62 includes a reply signal generator 76, a channel multiplexer 78, an IFFT section 80, a CP application section 82, a DA converter 84, and an upconverter 86.

The receiver 60 receives a reference signal transmitted from the wireless base station 14 via an antenna element 64. Explanation follows regarding the function of each functional section of the receiver 60.

The downconverter 66 receives an analog signal expressing the reference signal transmitted from the wireless base station 14 via the antenna element 64. The downconverter 66 converts the frequency of the received RF band frequency analog signal to a base band signal. The AD converter 68 converts the analog signal that have been frequency-converted by the downconverter 66 into a digital signal.

The CP removal section 70 removes CP from the digital signal that has been converted by the AD converter 68, thereby generating valid symbols. The FFT section 72 performs fast Fourier transformation on the valid symbols generated by the CP removal section 70. The channel estimation section 74 estimates the channel used for the digital signal that underwent fast Fourier transformation at the FFT section 72.

The transmitter 62 transmits to the wireless base station 14, via the antenna element 64, a reception quality value for each reference signal received by the receiver 60 in association with a beam B. Explanation follows regarding the function of each functional section of the transmitter 62.

The reply signal generator 76 employs the channel estimation outcome of the channel estimation section 74 to derive a reception quality value for reference signals, and generates a digital signal expressing the derived reception quality value. The channel multiplexer 78 maps the digital signal generated by the reply signal generator 76 to subcarriers. The IFFT section 80 performs inverse fast Fourier transformation on the subcarriers mapped to the digital signal by the channel multiplexer 78, converting the subcarriers to valid symbols.

The CP application section 82 generates OFDM symbols by applying a CP to the valid symbols that have been converted by the IFFT section 80. The DA converter 84 converts the digital signal expressing the OFDM symbols generated by the CP application section 82 into an analog signal. The upconverter 86 converts the frequency of the analog signal that has been converted by the DA converter 84 to an RF band frequency. The upconverter 86 then transmits the analog signal expressing the reception quality value obtained via frequency conversion to the wireless base station 14 via the antenna element 64.

Note that in cases in which the reception quality value is a received power value, the RF band analog signal may be used to derive the received power value prior to frequency conversion by the downconverter 66.

Figure 5:
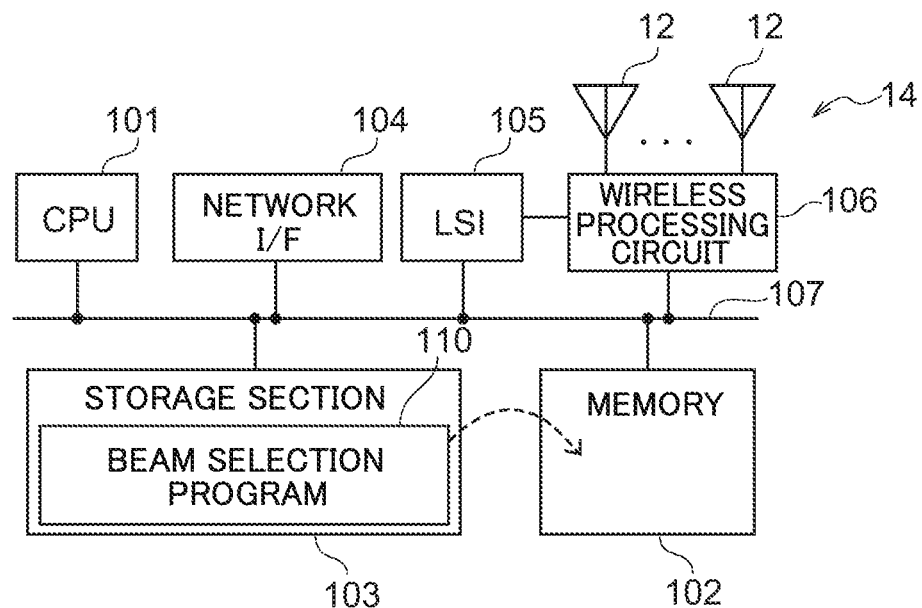
FIG. 5 is a block diagram illustrating hardware configuration of a wireless base station according to an exemplary embodiment.

Next, explanation follows regarding hardware configuration of the wireless base station 14, with reference to FIG. 5. As illustrated in FIG. 5, the wireless base station 14 includes a central processing unit (CPU) 101, memory 102 serving as a temporary storage region, and a non-volatile storage section 103. The wireless base station 14 further includes a network I/F 104 connected to a core network in order to communicate with other wireless base stations and the like, a large-scale integration (LSI) circuit 105, and a wireless processing circuit 106 to which the antenna elements 12 are connected. The CPU 101, the memory 102, the storage section 103, the network I/F 104, the LSI circuit 105, and the wireless processing circuit 106 are connected together through a bus 107. The LSI circuit 105 and the wireless processing circuit 106 are directly connected to one another.

The storage section 103 may be implemented by a hard disk drive (HDD), a solid state drive (SSD), flash memory, or the like. The storage section 103, which serves as a storage medium, is stored with a beam selection program 110. The CPU 101 reads the beam selection program 110 from the storage section 103, expands the beam selection program 110 into the memory 102, and executes the beam selection program 110. The CPU 101 functions as reference signal generator 26, the channel multiplexer 28, the IFFT section 30, the CP application section 32, and the analog BF controller 40 of the transmitter 20 illustrated in FIG. 3 by executing the beam selection program 110. The CPU 101 also functions as the user data generator 52 and the digital precoder 54 of the transmitter 20 illustrated in FIG. 3 by executing the beam selection program 110. The CPU 101 also functions as the CP removal section 46, the FFT section 48, and the demodulator 50 of the receiver 22 illustrated in FIG. 3 by executing the beam selection program 110. The CPU 101 also functions as the selector 24 illustrated in FIG. 3 by executing the beam selection program 110.

The DA converter 34 of the transmitter 20 and the AD converter 44 of the receiver 22 are implemented by the LSI circuit 105. The upconverter 36 and the analog BF section 38 of the transmitter 20, and the downconverter 42 of the receiver 22, are implemented by the wireless processing circuit 106.

The functions implemented by the beam selection program 110 may also be implemented by, for example, a semiconductor integrated circuit, more specifically, by an Application Specific Integrated Circuit (ASIC) or the like.

Figure 6:
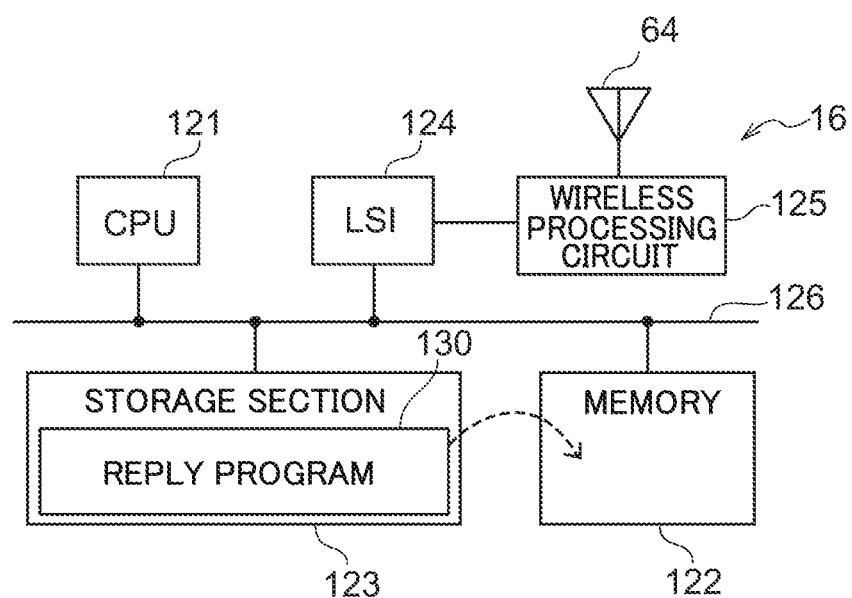
FIG. 6 is a block diagram illustrating hardware configuration of a user device according to an exemplary embodiment.

Next, explanation follows regarding a hardware configuration of the user device 16, with reference to FIG. 6. As illustrated in FIG. 6, each user device 16 includes a CPU 121, memory 122 serving as a temporary storage region, a non-volatile storage section 123, an LSI 124, and a wireless processing circuit 125 to which the antenna element 64 is connected. The CPU 121, the memory 122, the storage section 123, and the LSI 124 are connected together through a bus 126. The LSI 124 and the wireless processing circuit 125 are directly connected to one another.

The storage section 123 may be implemented by an HDD, SSD, flash memory, or the like. The storage section 123, serving as a storage medium, is stored with a reply program 130. The CPU 121 reads the reply program 130 from the storage section 123, expands the reply program 130 into the memory 122, and executes the reply program 130. The CPU 121 functions as the CP removal section 70, the FFT section 72, and the channel estimation section 74 of the receiver 60 illustrated in FIG. 4 by executing the reply program 130. The CPU 121 also functions as the reply signal generator 76, the channel multiplexer 78, the IFFT section 80, and the CP application section 82 of the transmitter 62 illustrated in FIG. 4 by executing the reply program 130.

The AD converter 68 of the receiver 60 and the DA converter 84 of the transmitter 62 are implemented by the LSI 124. The downconverter 66 of the receiver 60 and the upconverter 86 of the transmitter 62 are implemented by the wireless processing circuit 125.

The functions implemented by the reply program 130 may also be implemented by, for example, a semiconductor integrated circuit, more specifically, by an ASIC or the like.

Figure 7:
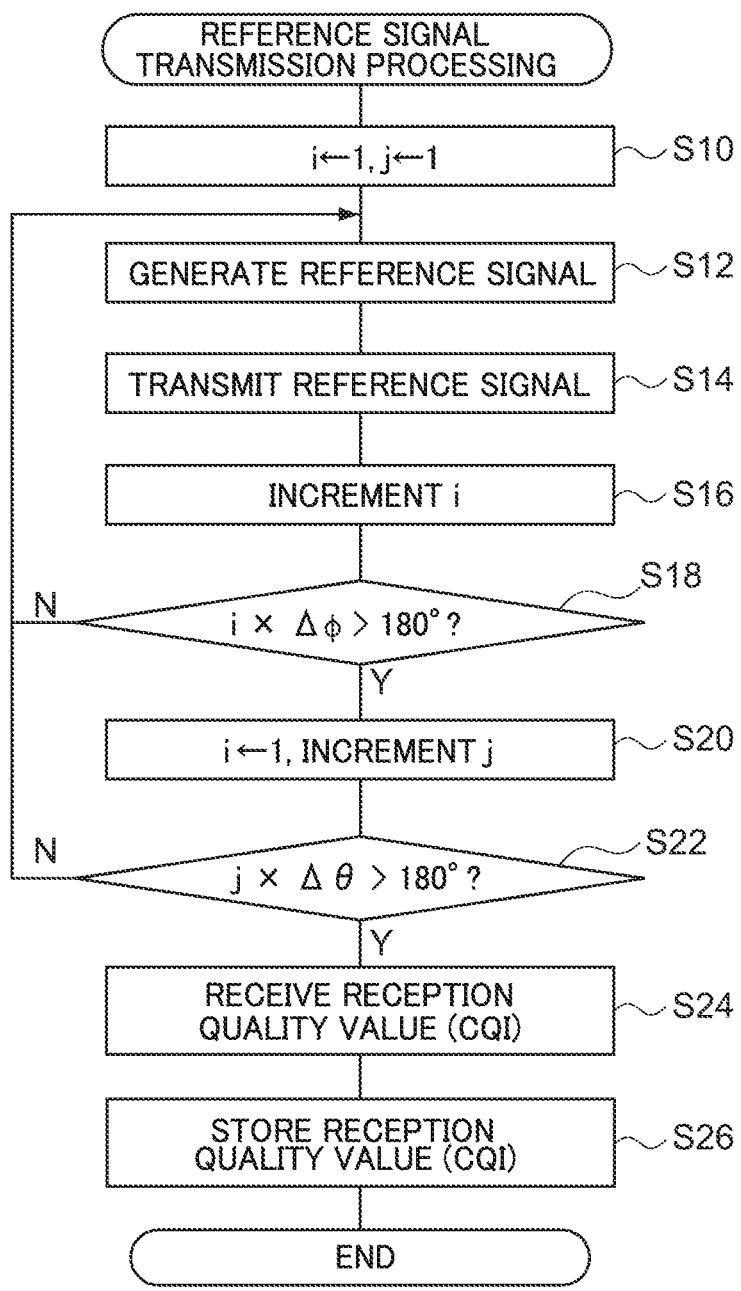
FIG. 7 is a flowchart illustrating an example of reference signal transmission processing according to an exemplary embodiment.
Figure 8:
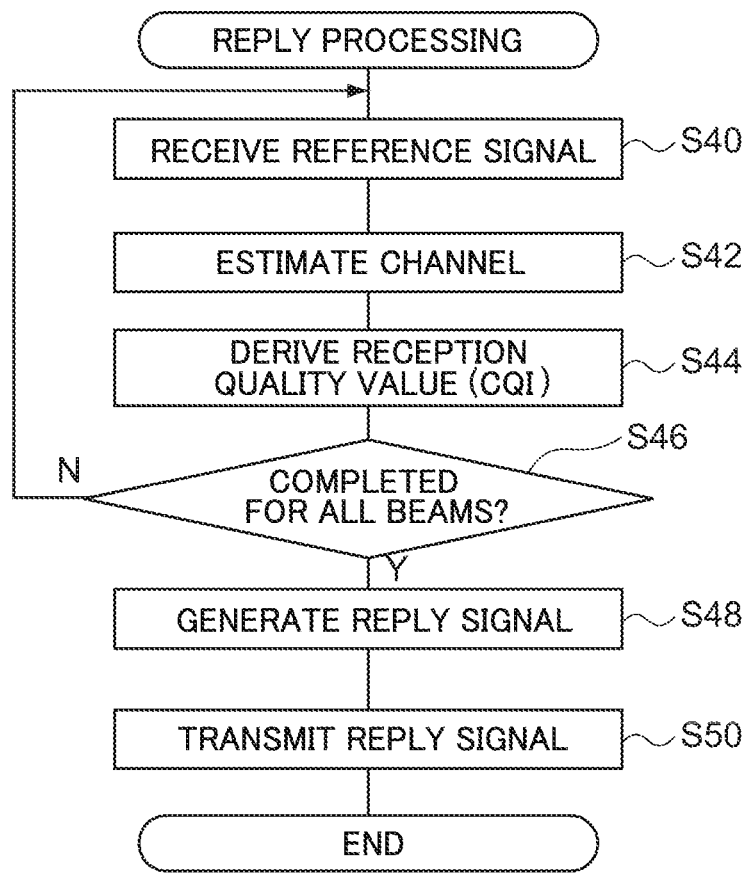
FIG. 8 is a flowchart illustrating an example of reply processing according to an exemplary embodiment.
Figure 9B:
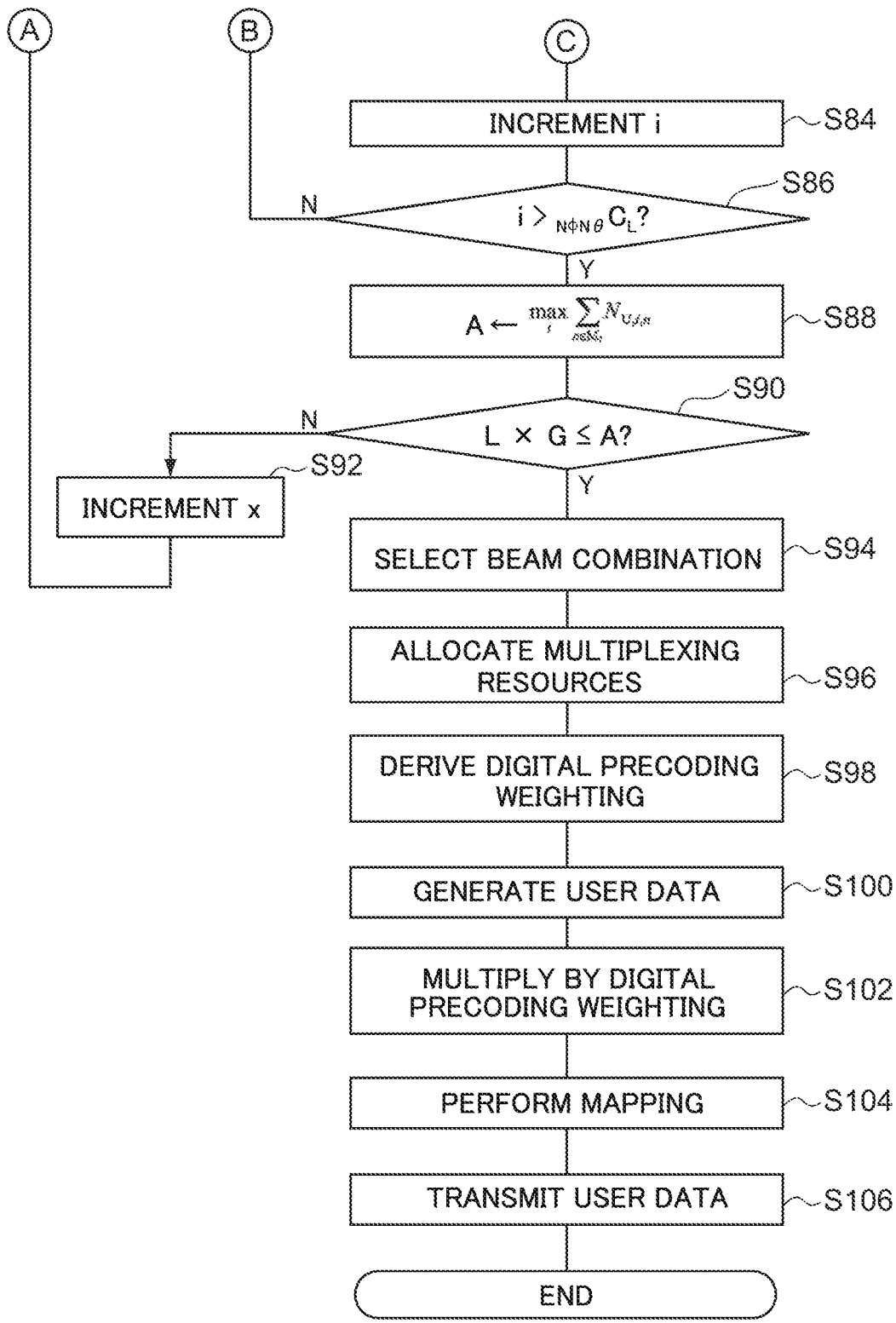

Next, explanation follows regarding operation of the wireless communication system 10 according to the present exemplary embodiment. The wireless base station 14 executes the reference signal transmission processing illustrated in FIG. 7 and the beam selection processing illustrated in FIG. 9A and FIG. 9B as a result of executing the beam selection program 110. The user devices 16 execute the reply processing illustrated in FIG. 8 as a result of executing the reply program 130. The reference signal transmission processing illustrated in FIG. 7 is, for example, executed at regular intervals. The beam selection processing illustrated in FIG. 9A and FIG. 9B is, for example, executed when transmitting user data. The reply processing illustrated in FIG. 8 is, for example, executed the first time that a reference signal transmitted from the wireless base station 14 by the reference signal transmission processing is received.

At step S10 of the reference signal transmission processing illustrated in FIG. 7, the analog BF controller 40 assigns values of 1 to a counter variable i and a counter variable j. At the next step S12, the reference signal generator 26 generates a downlink reference signal. The channel multiplexer 28 maps the generated reference signal to subcarriers. The IFFT section 30 performs inverse fast Fourier transformation on the subcarriers mapped to the reference signal, and converts the subcarriers into valid symbols. The CP application section 32 applies a CP to the valid symbols obtained by this conversion so as to generate OFDM symbols, and outputs the generated OFDM symbols to the DA converter 34.

The OFDM symbols output from the CP application section 32 are converted into an analog signal by the DA converter 34, and the frequency of the analog signal obtained by this conversion is converted into an RF band frequency by the upconverter 36. At the next step S14, the analog BF controller 40 controls the analog BF section 38 so as to transmit the reference signal output from the upconverter 36 to user devices 16 in the following manner. Namely, the analog BF controller 40 applies the analog BF vector w(i×j×Δθ) to the analog signal expressing the reference signal so as to form a beam B and transmit the reference signal to the user device 16 via the antenna elements 12.

At the next step S16, the analog BF controller 40 increments (adds 1 to) the value of the variable i. At the next step S18, the analog BF controller 40 determines whether or not the value obtained by multiplying the value of the variable i by Δϕ is greater than 180°. Processing returns to step S12 when determination is negative, and processing transitions to step S20 when determination is affirmative.

At step S20, the analog BF controller 40 assigns a value of 1 to the variable i, and increments the value of the variable j. At the next step S22, the analog BF controller 40 determines whether or not the value obtained by multiplying the value of the variable j by Δθ is greater than 180°. Processing returns to step S12 when determination is negative, and processing transitions to step S24 when determination is affirmative.

Each user device 16 transmits an analog signals expressing CQI to the wireless base station 14 with the following reply processing. CQI is derived using reference signals transmitted by the beams B that have been formed in plural directions as a result of repeating the processing of step S12 to step S22. When analog signals are transmitted from the user devices 16, the downconverter 42 receives the analog signals via the antenna elements 12, and the analog signals are subject to frequency conversion so as to obtain base band signals.

The analog signals obtained via frequency conversion are converted into digital signals by the AD converter 44 and output to the CP removal section 46. At step S24, the CP removal section 46 removes CP from the digital signals input from the AD converter 44, thereby generating valid symbols. The FFT section 48 performs fast Fourier transformation on the generated valid symbols. The demodulator 50 demodulates the digital signals that underwent fast Fourier transformation at the FFT section 48 so as to acquire CQIs corresponding to each beam B.

At step S26, the demodulator 50 stores the CQIs obtained from the analog signals transmitted the user devices 16 in the processing of step S24 in a predetermined storage region of the storage section 103, in association with respective user devices 16. When the processing of step S26 is complete, the reference signal transmission processing ends.

The analog signals expressing the reference signals transmitted by the processing of step S14 of the reference signal transmission processing are received by the downconverters 66 of the respective user devices 16, and are subject to frequency conversion to base band signals. The analog signal obtained via frequency conversion is converted to a digital signal by the AD converter 68, and is output to the CP removal section 70. At step S40 of the reply processing illustrated in FIG. 8, the CP removal section 70 removes CP from the digital signal input from the AD converter 68, thereby generating valid symbols. The FFT section 72 performs fast Fourier transformation on the generated valid symbols.

At the next step S42, the channel estimation section 74 performs channel estimation using the digital signal obtained using fast Fourier transformation at step S40. At the next step S44, the reply signal generator 76 uses the channel estimation outcome from step S42 to derive CQI as the reception quality value for the reference signal. At the next step S46, the reply signal generator 76 determines whether or not the processing of step S40 to step S44 has been completed for every beam B. Processing returns to step S40 when determination is negative, and processing transitions to step S48 when determination is affirmative.

At step S48, the reply signal generator 76 generates a digital signal expressing the CQI derived for each beam B at step S44. At the next step S50, the channel multiplexer 78 maps the digital signal generated at step S48 to subcarriers. The IFFT section 80 performs inverse fast Fourier transformation on the subcarriers mapped to the digital signal and converts the subcarriers into valid symbols. The CP application section 82 generates OFDM symbols by applying CP to the valid symbols obtained by this conversion, and outputs the OFDM symbols to the DA converter 84.

The OFDM symbols output from the CP application section 82 are converted to an analog signal by the DA converter 84. The frequency of the analog signal obtained by this conversion is converted to an RF band frequency by the upconverter 86 and transmitted to the wireless base station 14 via the antenna element 64. The analog signals expressing CQI transmitted from the user devices 16 are received by the processing of step S24 of the reference signal transmission processing described above. When the processing of step S50 is complete, the reply processing ends.

At step S60 of the beam selection processing illustrated in FIG. 9A, the selector 24 assigns the value 0 to a variable x employed to lower the specific value employed when deriving the number of user devices 16 for which the reception quality value is at least the specific value, as described above. At the next step S62, the selector 24 assigns the value 1 to the variable i used as a counter for combinations of L beams B.

At the next step S64, the selector 24 assigns the value 0 to a variable $N_{U,i}$ storing the number of the user devices 16 for which the reception quality value is at least the specific value in the $i^{th}$ combination of L beams B. The selector 24 also assigns the value 1 to a variable n used as a counter for beams B in the combinations of L beams B.

At the next step S66, the selector 24 selects the $i^{th}$ combination of beams B from out of the all selectable combinations of L beams B in the ($N_\phi \times N_\theta$) beams B formed at step S14 of the reference signal transmission processing described above. At the next step S68, the selector 24 assigns the value 1 to a variable u used as a counter for user devices 16.

At the next step S70, the selector 24 reads the $CQI_{u,i,n}$ of the $u^{th}$ user device 16 corresponding to the $n^{th}$ beam B in the $i^{th}$ combination of beams B from out of the CQIs that were stored in the storage section 103 at step S26 of the reference signal transmission processing described above. At the next step S72, the selector 24 determines whether or not the $CQI_{u,i,n}$ read at step S70 greater than or equal to a value obtained by subtracting the value of the variable x from $CQI_{max}$. Processing transitions to step S76 when determination is negative, and processing transitions to step S74 when determination is affirmative.

At step S74, the selector 24 increments the value of the variable $N_{U,i}$. At step S76, the selector 24 increments the value of the variable u. At the next step S78, the selector 24 determines whether or not the value of the variable u is greater than the number $N_U$ of the user devices 16 that received reference signal transmitted at step S14 of the reference signal transmission processing described above. Processing returns to step S70 when determination is negative, and processing transitions to step S80 when determination is affirmative.

At step S80, the selector 24 increments the value of the variable n. At the next step S82, the selector 24 determines whether or not the value of the variable n is greater than L. Processing returns to step S68 when determination is negative, and processing transitions to step S84 when determination is affirmative.

At step S84, the selector 24 increments the value of the variable i. At the next step S86, the selector 24 determines whether or not the value of the variable i is greater than $_{N_\phi N_\theta}C_L$, which is the number of selectable combinations of L beams B from out of the ($N_\phi \times N_\theta$) beams B. Processing returns to step S64 when determination is negative, and processing transitions to step S88 when determination is affirmative.

By repeating the processing of step S64 to step S86 above, for each combination of L beams B, the number of user devices 16 for which. CQI is at least the specific value is stored in the variable $N_{U,i}$. Namely, the following part of Equation (3) is derived by this repeated processing:

$$\sum_{n=M_i} N_{U,i,n}$$

At step S88, in accordance with Equation (3) above, the selector 24 assigns, to a variable A, the greatest value for the number of user devices 16 that had a derived CQI of at least the specific value in the combinations of L beams B. At the next step S90, the selector 24 determines whether or not (L×G) is less than or equal to the variable A. Processing transitions to step S92 when determination is negative.

At step S92, the selector 24 increments the value of the variable x. When the processing of step S92 has been completed, processing returns to step S62. However, processing transitions to step S94 when affirmative determination is made at step S90. At step S94, the selector 24 selects combination i* of L beams B in accordance with Equation (4) above.

At the next step S96, as described above, the selector 24 allocates a frequency-division multiplexing multiplexing resource to each of the plural user devices 16 receiving the same beam B. At the next step S98, as described above, the selector 24 derives a digital precoding weighting that reduces electromagnetic wave interference for the user devices 16 allocated the same multiplexing resource but receiving different beams B at step S96.

At the next step S100, the user data generator 52 generates user data for each user device 16 that is a user data transmission destination. At the next step S102, the digital precoder 54 multiplies the user data generated at step S100 by the digital precoding weighting derived at step S98 corresponding to the respective transmission destination user device 16.

At the next step S104, the channel multiplexer 28 maps the user data that has been multiplied by a digital precoding weighting at step S102 to subcarriers, employing the respective multiplexing resource allocated to each user device 16 at step S96. The IFFT section 30 performs inverse fast Fourier transformation on the mapped subcarriers and converts the subcarriers into valid symbols. The CP application section 32 applies a CP to the valid symbols obtained by this conversion to generate OFDM symbols, and outputs the generated OFDM symbols to the DA converter 34.

The OFDM symbols output from the CP application section 32 are converted into analog signals by the DA converter 34, and the frequency of the analog signals obtained by this conversion is converted to an RF band frequency by the upconverter 36. At the next step S106, the analog BF controller 40 controls the analog BF section 38 to apply the analog BF vector corresponding to the combination of L beams B selected at step S94. The analog BF section 38 thus forms L beams B and transmits user data to transmission destination user devices 16. When the processing of step S106 is complete, the beam selection processing ends.

As described above, in the present exemplary embodiment, indicator values representing reception quality for groups of user devices 16 that have been computed using reception quality values from each of plural user devices 16 are employed to select a combination of beams B from plural beams B formed when transmitting reference signals.

Figure 10:
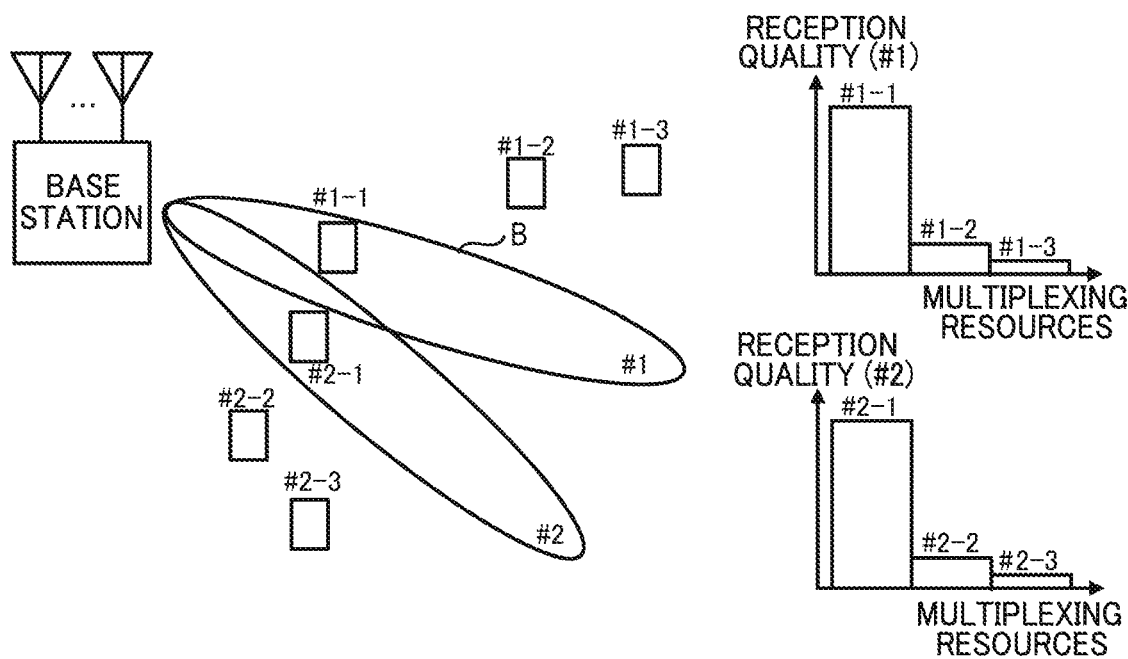
FIG. 10 is a diagram illustrating an example of user device reception quality in cases in which each beam focuses on a user device.

In technology in which each beam focuses on a user device, as illustrated in FIG. 10, for example, sometimes a beam with a relatively high reception quality is selected for particular user devices (#1-1, #2-1 in FIG. 10). However, in such cases, there may be a marked drop in reception quality for other user devices (#1-2, #1-3, #2-2, #2-3 in FIG. 10).

Figure 11:
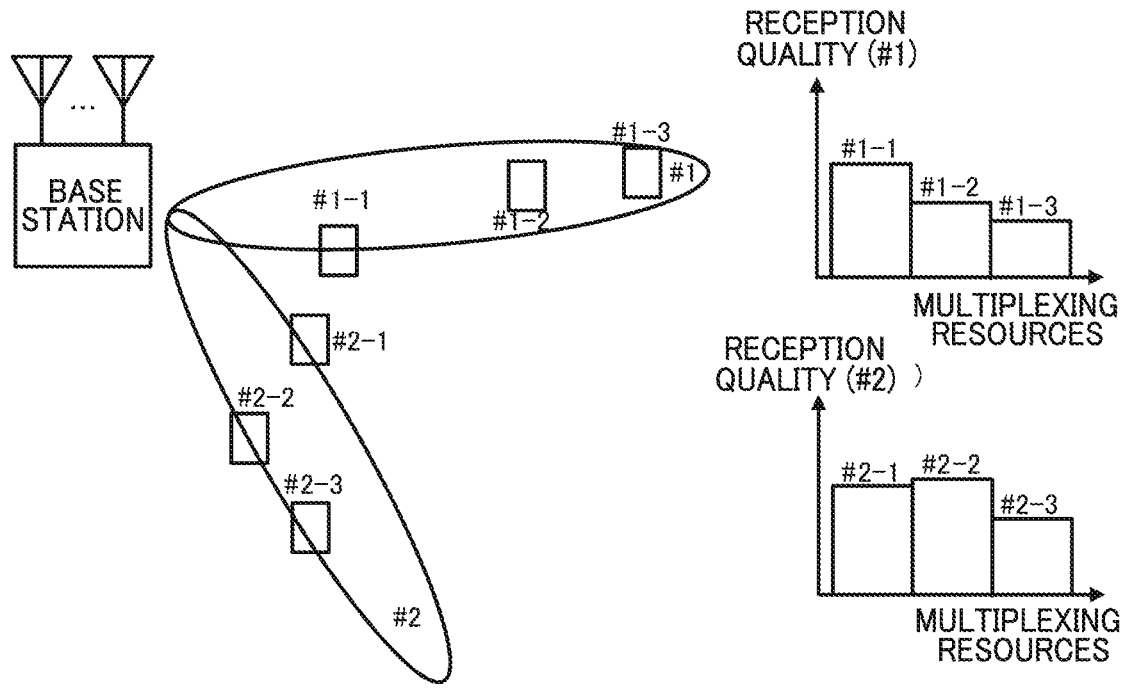
FIG. 11 is a diagram illustrating an example of user device reception quality according to an exemplary embodiment.

By contrast, the present exemplary embodiment employs indicator values representing reception quality for groups of user devices that have been computed using reception quality values from each of plural user devices. Accordingly, as illustrated in FIG. 11, for example, beam combinations are selected such that entire groups of user devices experience relatively high reception quality. Note that FIG. 10 and FIG. 11 illustrate examples in which L is 2, G is 3, and the number of user devices is 6.

The present exemplary embodiment thereby enables a drop in overall reception quality for plural user devices to be suppressed.

Moreover, in the present exemplary embodiment, when the transmitter 20 is transmitting user data, and the number of user devices 16 receiving a single beam B is greater than the number of multiplexing resources that can be allocated to the single beam B, user data is transmitted in the following manner. Namely, in such cases, the transmitter 20 allocates multiplexing resources, performs multiplexing, and transmits user data in sequence from the user devices 16 with the highest reference signal reception quality.

The present exemplary embodiment thereby enables prioritized communication with user devices having high reception quality.

Moreover, in to the present exemplary embodiment, when selecting the combination of beams B with the greatest the number of user devices 16 for which the value representing the reception quality of the reference signal at least the specific value, the selector 24 selects the combination of beams B in the following manner. Namely, in such cases, the selector 24 lowers the specific value until the number of user devices 16 is greater than or equal to a value obtained by multiplying the number of selected beams B by the number of multiplexing resources for each beam B, and then the selector 24 selects the combination of beams B.

The present exemplary embodiment thus enables the selection of beam combinations that are able to communicate with more user devices. Moreover, since the present exemplary embodiment enables communication with more user devices at the same time, the time spent on scheduling for all user devices is able to be reduced.

Second Exemplary Embodiment

In the first exemplary embodiment, explanation is given regarding a case in which the number of the user devices 16 for which reception quality value is at least a specific value is applied as an indicator value representing reception quality for groups of user devices 16. In the present exemplary embodiment, explanation is given regarding a case in which a sum of reception quality values for plural user devices 16 is applied as an indicator value representing reception quality for groups of user devices 16. Note that the configuration of the wireless communication system 10 (see FIG. 1 and FIG. 2), the functional configuration of the user devices 16 (see FIG. 4), the hardware configuration of the wireless base station 14 (see FIG. 5), and the hardware configuration of the user devices 16 (see FIG. 6) is the same as in the first exemplary embodiment, and so explanation thereof is omitted.

Explanation first follows regarding functional configuration of the wireless base station 14 according to the present exemplary embodiment with reference to FIG. 3. Note that explanation focuses on parts that differ from that in the first exemplary embodiment.

The selector 24 according to the present exemplary embodiment selects a combination of L beams B for which the sum of the reception quality values is greatest from out of all combinations of L beams B selected from $(N_\phi \times N_\theta)$ beams. Specifically, for each of combination of L beams B, the selector 24 computes a sum $CQI_{sum,i}$ of the CQIs returned from user devices 16 in accordance with Equation (5) below.

$$CQI_{sum,i} = \sum_{n=M_i}^{N_U} \sum_{u=1} CQI_{u,n} \quad (5)$$

Then, in accordance with Equation (6) below, the selector 24 selects the combination i* of L beams B for which the sum $CQI_{sum,i}$ of reception quality values is greatest as the combination of beams B used when transmitting user data to the user devices 16.

$$i^* = \arg\max_i CQI_{sum,i} \quad (6)$$

Figure 12:
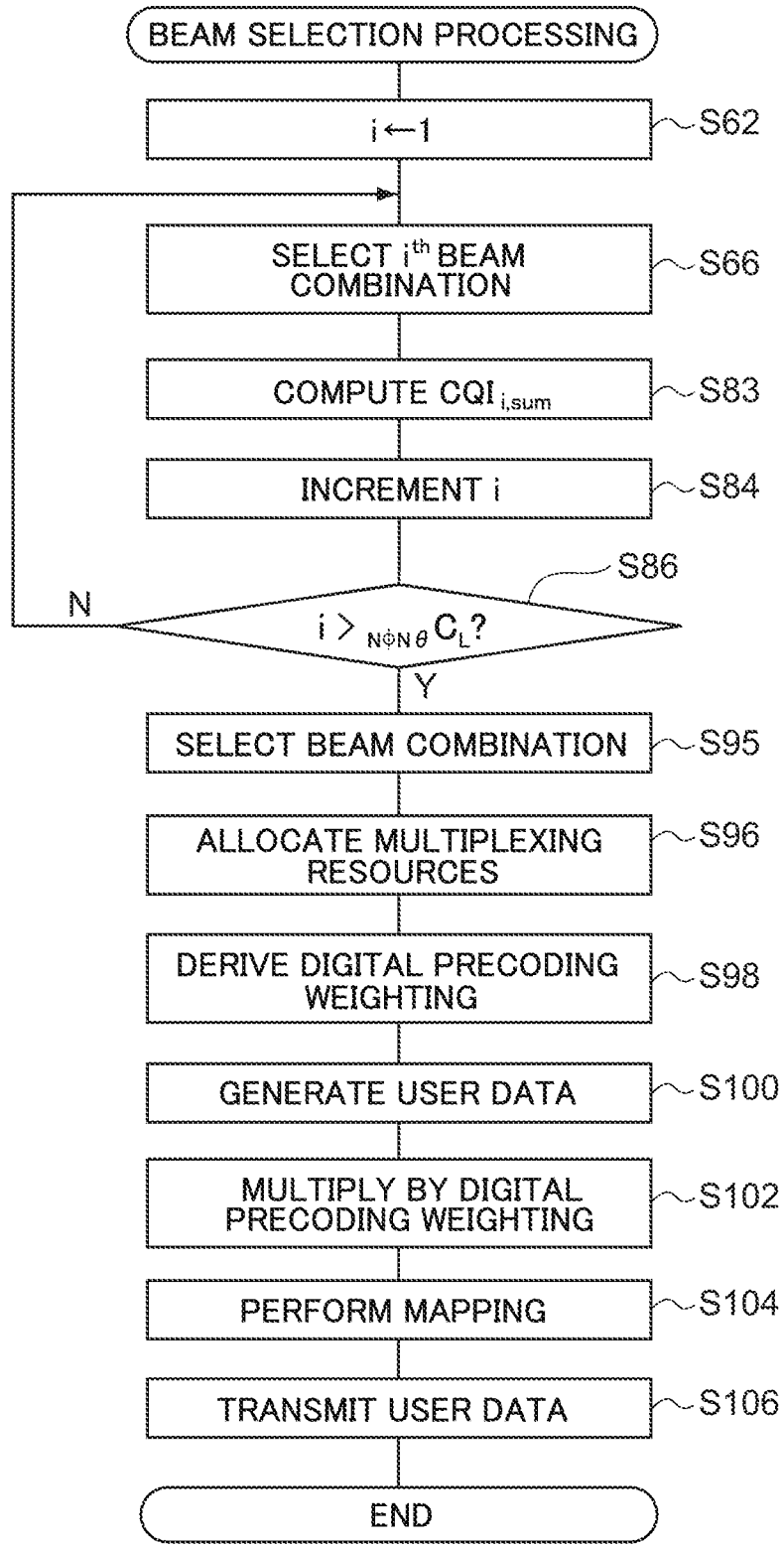
FIG. 12 is a flowchart illustrating an example of beam selection processing according to a second exemplary embodiment.

Next, explanation follows regarding operation of the wireless communication system 10 according to the present exemplary embodiment, with reference to FIG. 12. Note that the reference signal transmission processing (see FIG. 7) and the reply processing (see FIG. 8) are the same as in the first exemplary embodiment, and so explanation thereof is omitted. Further, in FIG. 12, steps to perform processing that are the same as that in FIG. 9A and FIG. 9B are allocated the same step numbers as in FIG. 9A and FIG. 9B, and explanation thereof is omitted.

At step S83 of the beam selection processing illustrated in FIG. 12, the selector 24 computes the sum $CQI_{sum,i}$ of the CQIs corresponding to the combination of beams B from out of the CQIs that were stored in the storage section 103 at step S26 of the reference signal transmission processing described above.

At step S95, in accordance with Equation (6) above, the selector 24 selects the combination i* of L beams B for which the sum $CQI_{sum,i}$, computed for each combination of L beams B at step S83, is greatest.

As described above, the present exemplary embodiment enables a drop in overall reception quality for plural user devices to be suppressed similarly to in the first exemplary embodiment.

Moreover, in the present exemplary embodiment, the sum of reception quality values for respective user devices 16 is applied as an indicator value representing reception quality for groups of user device 16. The present exemplary embodiment is thereby capable of reducing the amount of calculation when selecting a combination of L beams B.

Note that in the second exemplary embodiment above, products of reception quality values for the plural user devices 16 may be applied as an indicator values representing reception quality for groups of user devices 16. In such cases, in accordance with Equation (7) below, the selector 24 computes a product $CQI_{product,i}$ of the CQIs returned from user devices 16 for each combination of L beams B.

$$CQI_{product,j} = \prod_{n=M_i}^{N_U} \prod_{u=1} CQI_{u,n} \quad (7)$$

Then, in accordance with Equation (8) below, the selector 24 then selects the combination i* of L beams B for which the product $CQI_{product,i}$ is greatest as the combination of beams B used when transmitting user data to the user devices 16.

$$i^* = \arg\max_i CQI_{product,i} \quad (8)$$

Moreover, in the second exemplary embodiment above, average values of reception quality values for plural user devices 16 may be applied as the indicator values representing reception quality for groups of user devices 16.

In the exemplary embodiments described above, although explanation is given regarding cases in which each user device 16 is provided with a single antenna element 64, there is no limitation thereto. Each user device 16 may be provided with plural of the antenna elements 64. In such cases, for example, configuration may be such that the user devices 16 derive a reception quality value for each antenna element 64. In such cases, the wireless base station 14 may regard a single antenna element 64 as being a single user device 16, and then select a combination of beams B similarly to in the exemplary embodiments described above.

Moreover, for example, in cases in which the wireless base station 14 knows the number of antenna elements 64 provided to each user device 16, configuration may be such that each user device 16 derives a reception quality value for a single antenna element 64. In such cases, for example, the wireless base station 14 may copy the reception quality value transmitted from each user device 16 for each of its antenna elements 64, and then select a combination of beams B.

Figure 13:
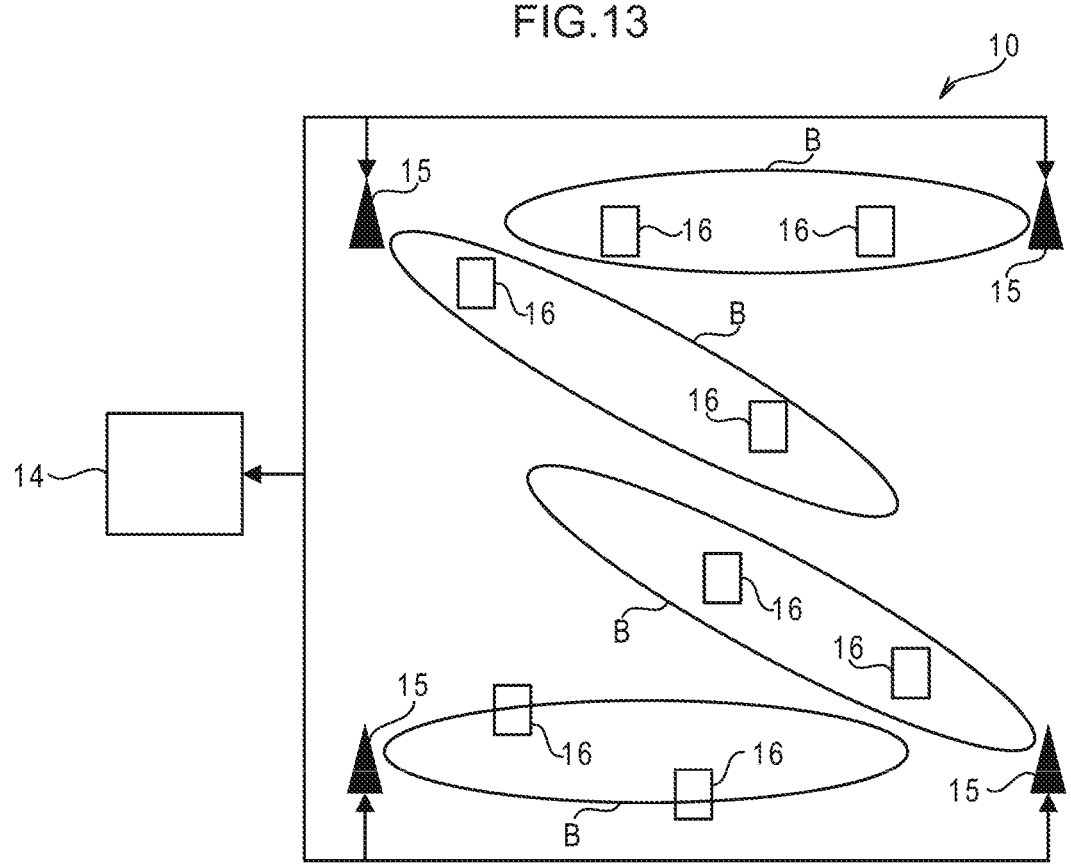
FIG. 13 is a block diagram illustrating a schematic configuration of a wireless communication system according to a modified example.
Figure 14:
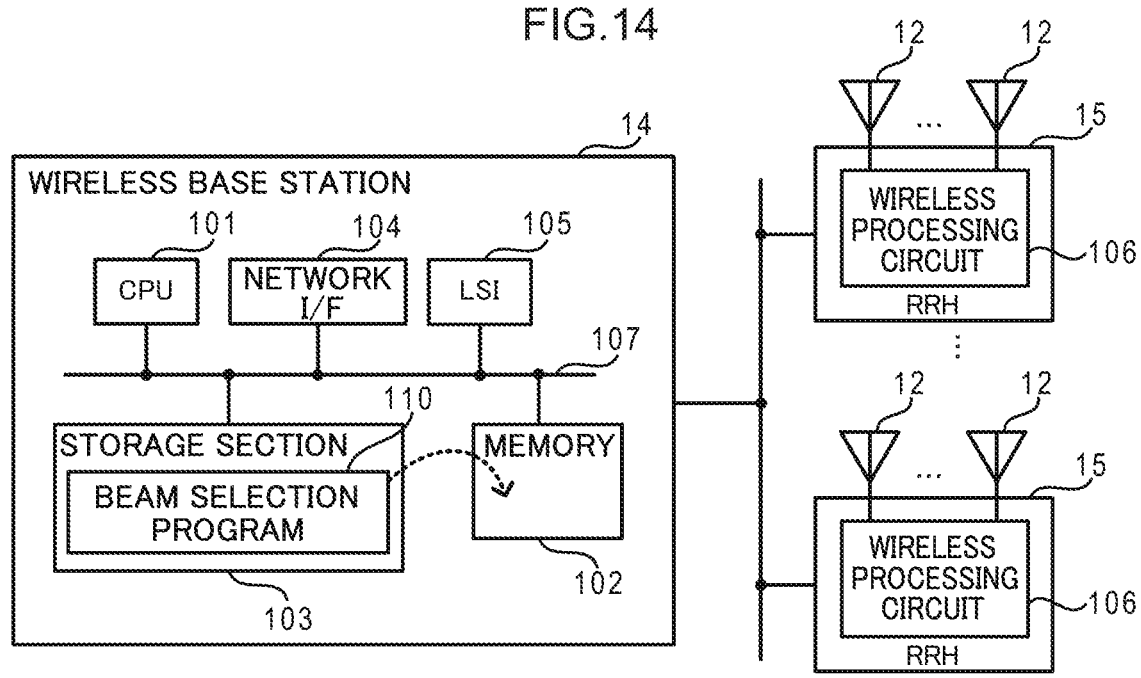
FIG. 14 is a block diagram illustrating hardware configuration of a wireless base station according to a modified example.

Moreover, in the exemplary embodiments described above, although explanation is given regarding cases in which the wireless base station 14 forms beams B in plural directions from a single location, there is no limitation thereto. For example, the wireless base station 14 may form beams B in plural directions from plural locations. In such cases, as illustrated in FIG. 13, for example, N (N being an integer greater than or equal to 2) remote radio heads (RRH) 15 may be disposed at geographically discrete locations. FIG. 14 illustrates an example of hardware configuration for the wireless base station 14 in such cases. Note that in FIG. 14 configuration elements matching those in FIG. 5 are allocated the same reference numerals, and explanation thereof is omitted.

As illustrated in FIG. 14, in this example, each RRH 115 is provided with a wireless processing circuit 106 and antenna elements 12. Moreover, in such cases, configuration may be such that the wireless base station 14 executes the processing of steps S60 to S94 in FIG. 9A and FIG. 9B using $_{NN\phi N\theta}C_L$ in place of $_{N\phi N\theta}C_L$.

Figure 15:
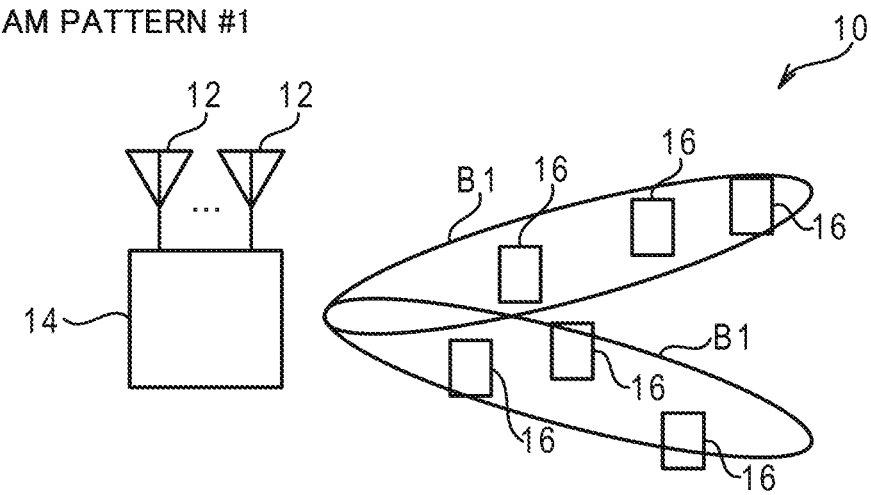
FIG. 15 is a block diagram to explain the shape of beams according to a modified example.
Figure 15:
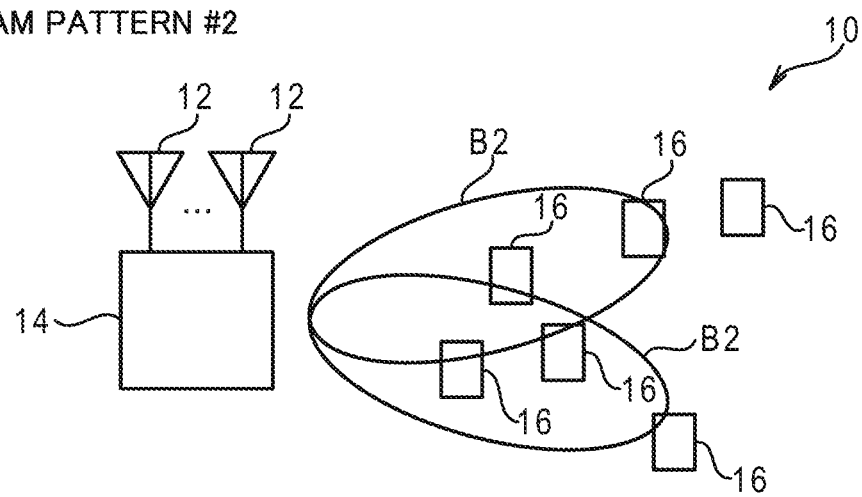

Moreover, in the exemplary embodiments described above, as illustrated in FIG. 15, for example, the shape of the beams B (for example, the width of the beams B) may be changed. In such cases, the wireless base station 14 forms beams B1 in the shape of beam pattern #1 illustrated in FIG. 15 and executes the reference signal transmission processing described above, and then forms beams B2 in the shape of beam pattern #2 illustrated in FIG. 15 and executes the reference signal transmission processing described above. The wireless base station 14 may then execute the beam selection processing described above employing reception quality values returned from each user device 16 in the respective beams B1, B2. Note that, for example, the beams B2, which are shaped wider than the beams B1, can be formed by setting only a portion of the elements of the analog BF vector $w(\phi, \theta)$ to a non-zero value.

Moreover, in the exemplary embodiments described above, although explanation is given regarding cases in which user devices 16 transmit reception quality values derived for each of the beams B to the wireless base station 14 together in a single transmission, there is no limitation thereto. For example, the user devices 16 may transmit reception quality values to the wireless base station 14 for each reference signal received.

Moreover, in the exemplary embodiments described above, although explanation is given regarding cases in which all reception quality values returned from user devices 16 are employed, there is no limitation thereto. For example, the wireless base station 14 may randomly select and employ plural reception quality values from out of all reception quality values returned from the user devices 16. In such cases, the indicator values representing reception quality for groups of user devices 16 that transmitted the plural selected reception quality values are computed employing the plural selected reception quality values. Moreover, for example, from out of all reception quality values returned from the user devices 16, the wireless base station 14 may select and employ plural reception quality values that are at least equal to a threshold value set as a lower limit value for reception quality values suitable for user data transmission. Moreover, for example, configuration may be such that the user devices 16 do not return a reception quality value to the wireless base station 14 in cases in which the reception quality value would be below a threshold value set as a lower limit value for reception quality values suitable for user data transmission.

Moreover, in the exemplary embodiments described above, although explanation is given in which the beam selection program 110 is pre-stored (installed) in the storage section 103, there is no limitation thereto. The beam selection program 110 may be provided in a format stored on a recording medium such as a CD-ROM, DVD-ROM, USB memory, or a memory card.

Moreover, in the exemplary embodiments described above, although explanation is given regarding in which the reply program 130 is pre-stored (installed) in the storage section 123, there is no limitation thereto. The reply program 130 may be provided in a format stored on a recording medium such as a CD-ROM, DVD-ROM, USB memory, or a memory card.

In the related art, each beam focuses on one user device, and a decision is made regarding how to allocate user devices per beam. Therefore, for example, in cases in which the number of user devices is relatively high, such as when there are more user devices than there are selectable beams, an issue arises whereby there is sometimes a marked drop in reception quality for user devices positioned a relatively long way from selected beams.

According to the present disclosure, a drop in overall reception quality for plural user devices can be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A wireless base station comprising:
  a transmitter that employs a plurality of antenna elements to form a beam in each of a plurality of transmission directions and transmit a reference signal;
  a receiver that receives a value representing reception quality of the reference signal for a user device that has received the reference signal;
  a memory; and
  a processor connected to the memory, the processor being configured to employ an indicator value, representing reception quality for a user device group computed from values received by the receiver that represent reception quality for each of a plurality of user devices, in order to select a combination of beams to employ in user data transmission from a plurality of beams transmitted by the transmitter.

2. The wireless base station of claim 1, wherein in a case of transmitting the user data, the transmitter:
- transmits the user data to a plurality of the user devices that receive a same selected beam by multiplexing using a multiplexing technique other than space-division multiplexing; and
- transmits the user data to a plurality of the user devices that receive different beams but use a same multiplexing resource by performing space-division multiplexing using digital precoding.

3. The wireless base station of claim 2, wherein in a case of transmitting the user data, and in a case in which a number of the user devices receiving a single one of the beams is greater than a number of allocable multiplexing resources for the single beam, the transmitter transmits the user data by allocating the multiplexing resources and multiplexing in sequence from a user device having a highest reference signal reception quality.

4. The wireless base station of claim 1, wherein the transmitter transmits the reference signal to a plurality of the user devices for which a connection has been established with the wireless base station.

5. The wireless base station of claim 1, wherein the value representing reception quality is a value quantizing the reference signal reception quality, or is a value quantizing a received power value of the reference signal.

6. The wireless base station of claim 1, wherein:
- the value representing reception quality becomes larger as reception quality increases; and
- the indicator value is a number of the user devices included in the user device group for which the value representing reception quality is at least a specific value, is a sum of the values representing reception quality for such user devices, or is a product of the values representing reception quality for such user devices.

7. The wireless base station of claim 1, wherein:
- the value representing reception quality becomes larger as reception quality increases;
- the indicator value is a number of the user devices included in the user device group for which the value representing reception quality is at least a specific value; and
- in a case of selecting a combination of the beams to give a greatest number of the user devices included in the user device group for which the value representing reception quality is at least the specific value, the processor lowers the specific value until the number of such user devices is greater than or equal to a value obtained by multiplying a number of selected beams by a number of multiplexing resources for each beam, and then the processor selects the combination of the beams.

8. A wireless communication method employed by a wireless base station provided with a plurality of antenna elements, the wireless communication method comprising:
- forming a beam in each of a plurality of transmission directions and transmitting a reference signal by employing the plurality of antenna elements;
- receiving a value representing reception quality of the reference signal for a user device that has received the reference signal; and
- by a processor, by employing an indicator value representing reception quality for a user device group computed from received values that represent reception quality for each of a plurality of user devices, selecting a combination of beams to employ in user data transmission from a plurality of transmitted beams.

9. The wireless communication method of claim 8, wherein in a case of transmitting the user data:
- the user data is transmitted to a plurality of the user devices that receive a same selected beam by multiplexing using a multiplexing technique other than space-division multiplexing; and
- the user data is transmitted to a plurality of the user devices that receive different beams but use a same multiplexing resource by performing space-division multiplexing using digital precoding.

10. The wireless communication method of claim 9, wherein in a case of transmitting the user data, and in a case in which a number of the user devices receiving a single one of the beams is greater than a number of allocable multiplexing resources for the single beam, the user data is transmitted by allocating the multiplexing resources and multiplexing in sequence from a user device having a highest reference signal reception quality.

11. The wireless communication method of claim 8, wherein the reference signal is transmitted to a plurality of the user devices for which a connection has been established with the wireless base station.

12. The wireless communication method of claim 8, wherein the value representing reception quality is a value quantizing the reference signal reception quality, or is a value quantizing a received power value of the reference signal.

13. The wireless communication method of claim 8, wherein:
- the value representing reception quality becomes larger as reception quality increases; and
- the indicator value is a number of the user devices included in the user device group for which the value representing reception quality is at least a specific value, is a sum of the values representing reception quality for such user devices, or is a product of the values representing reception quality for such user devices.

14. The wireless communication method of claim 8, wherein:
- the value representing reception quality becomes larger as reception quality increases;
- the indicator value is a number of the user devices included in the user device group for which the value representing reception quality is at least a specific value; and
- in a case of selecting a combination of the beams to give a greatest number of the user devices included in the user device group for which the value representing reception quality is at least the specific value, the specific value is lowered by the processor until the number of such user devices is greater than or equal to a value obtained by multiplying a number of selected beams by a number of multiplexing resources for each beam, and then the combination of the beams is selected by the processor.

15. A wireless communication system comprising:
- a wireless base station including:
  - a transmitter that employs a plurality of antenna elements to form a beam in each of a plurality of transmission directions and transmit a reference signal,
  - a receiver that receives a value representing reception quality of the reference signal for a user device that has received the reference signal, a memory, and a processor connected to the memory, the processor being configured to employ an indicator value, representing reception quality for a user device group computed from values received by the receiver that represent reception quality for each of a plurality of user devices, in order to select a combination of beams to employ in user data transmission from a plurality of beams transmitted by the transmitter; and the plurality of user devices, each user device including:

a receiver that receives the reference signal, and a transmitter that transmits the value representing the reference signal reception quality to the wireless base station.

* * * * *